United States Patent [19]

Kemp, Jr.

[11] 4,062,549
[45] Dec. 13, 1977

[54] SELF-COMPENSATING ROTARY SEAL FOR VERTICAL DRIVE SHAFT

[75] Inventor: Dennis E. Kemp, Jr., Maplewood, N.J.

[73] Assignee: Application Dynamics, Inc., South Orange, N.J.

[21] Appl. No.: 726,149

[22] Filed: Sept. 24, 1976

Related U.S. Application Data

[63] Continuation-in-part of Ser. No. 662,277, Feb. 27, 1976, Pat. No. 3,988,026.

[51] Int. Cl.² .............................................. F16J 15/34
[52] U.S. Cl. .................................... 277/12; 277/14 V
[58] Field of Search ...................... 277/4, 12, 13, 14 R, 277/14 V, 65, 83

[56] References Cited

U.S. PATENT DOCUMENTS

| | | | |
|---|---|---|---|
| 924,618 | 6/1909 | Lea | 277/12 |
| 1,273,648 | 7/1918 | Nachenivs | 277/12 |
| 1,844,619 | 2/1932 | Wintroath | 277/12 |
| 2,452,261 | 10/1948 | Roberts | 277/12 |
| 2,650,116 | 8/1953 | Cuny | 277/12 |
| 3,131,641 | 5/1964 | Cygnor | 277/13 |
| 3,910,585 | 10/1975 | Tabacchi | 277/14 V |
| 3,987,973 | 10/1976 | Reinhall | 277/14 R |
| 3,988,026 | 10/1976 | Kemp | 277/83 |

Primary Examiner—Robert I. Smith
Attorney, Agent, or Firm—Mark T. Basseches; Paula T. Basseches

[57] ABSTRACT

The present invention is directed to a self-compensating rotary seal member adapted to be used where a vertically directed shaft passes through an aperture in a casing or the like to prevent the passage through the aperture and consequent contamination of bearings, etc. disposed to the opposite side of (e.g. below) the casing. The seal assembly is characterized by the provision of a well member having upstanding cylindrical side walls and a generally horizontal floor portion formed of material having a low coefficient of friction, the shaft having keyed thereto a high density thrust washer which is gravitationally maintained in contact with the floor portion, the thrust washer being driven with the shaft.

8 Claims, 3 Drawing Figures

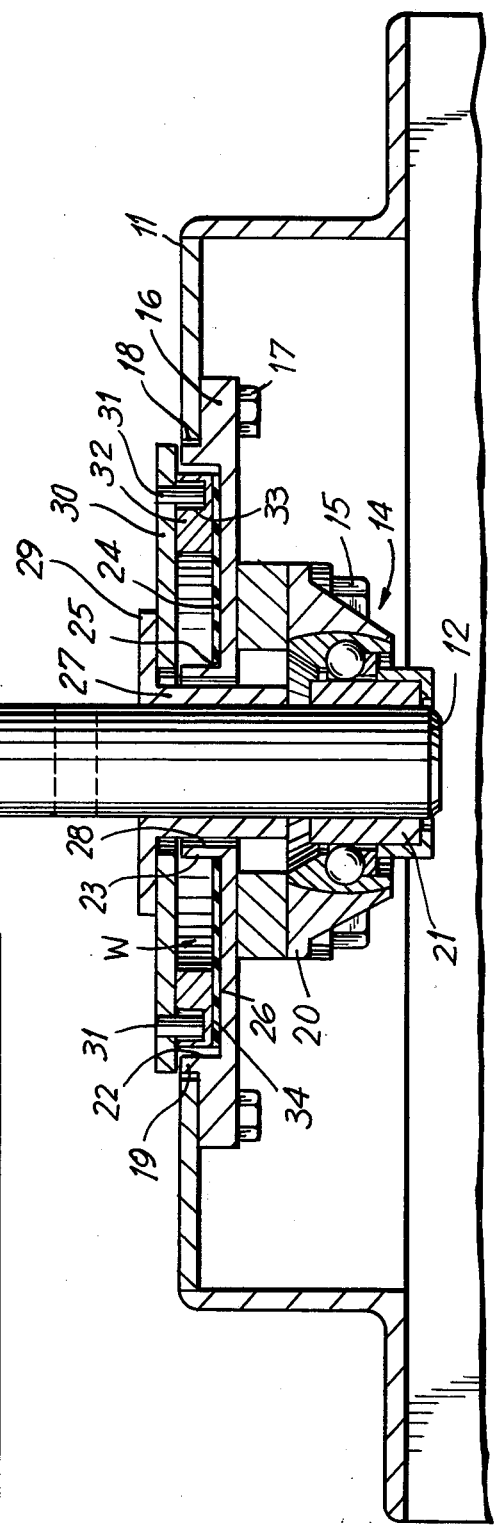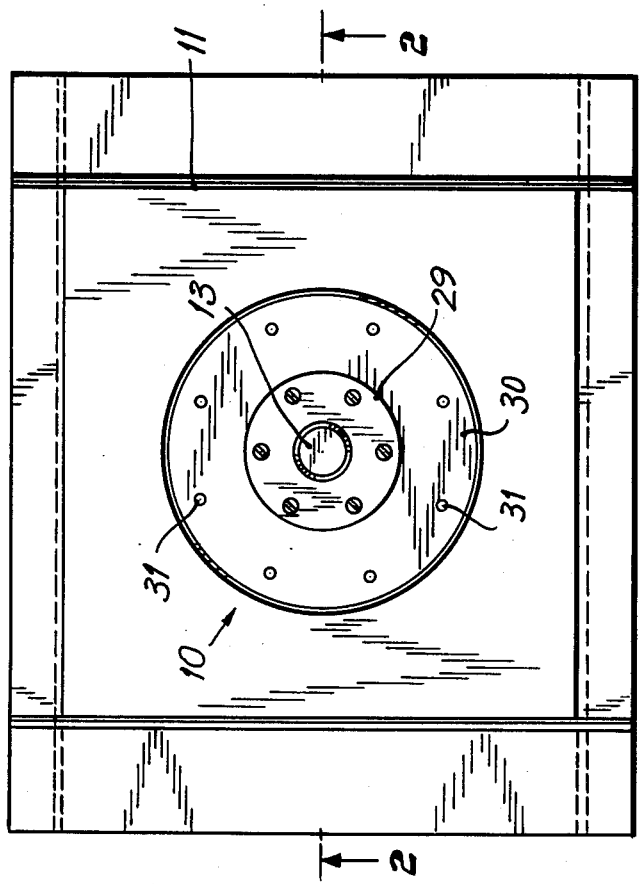

SELF-COMPENSATING ROTARY SEAL FOR VERTICAL DRIVE SHAFT

This application is a continuation-in-part of my copending application Ser. No. 662,277, filed Feb. 27, 1976 and now U.S. Pat. No. 3,988,026.

BACKGROUND OF THE INVENTION

1. Field of the Invention

The present invention is in the field or rotary seals for low pressure applications, and particularly for rotary seals for vertical shafts which pass through a casing, such as a wall, of a mixing container, feed auger assembly or the like.

2. The Prior Art

In many applications it is necessary to isolate a shaft bearing or the like disposed below a casing or vessel from pulverulent material located within the casing so that increments of the material do not pass downwardly through the area surrounding the shaft and contaminate the bearings or drive motor.

The typical sealing system utilized for such purpose employs a waste or packing suitably impregnated with a lubricant, the packing being mounted in a gland surrounding the shaft and pressing against the shaft. The sealing effect of such an arrangement is, of course dependent upon and proportional to the force with which the packing is pressed against the shaft periphery.

Seal devices operating on such basis are disadvantageous on many counts. Specifically, if the packing is tightly compressed against the shaft to effect a tight seal, starting torque is extremely high, ranging up to six or seven times the running torque. Moreover, seals depending upon packing pressure against the shaft require frequent adjustment of the gland to compensate for wear in the packing material.

Additionally, in an environment where the packing material is free to contact the material being processed, e.g. grinding or mixing application, lubricant from the packing will contaminate the material being processed. Similarly, the processed material may be absorbed into the packing and accelerate wear of the shaft.

The typical packing gland of the type mentioned will require adjustment every one hundred to two hundred hours of use, and will require complete replacement of packing about ever three months.

Packing gland seals engender the additional drawback, that they are incapable of compensating for eccentricities or axial misalignments between the rotating shaft and fixed components.

SUMMARY

The present invention may be summarized as directed to a self-compensating rotary seal assembly adapted to be applied to vertical shaft installations, the seal being highly resistant to the passage of pulverulent material. The seal automatically compensates for wear with out compromise of sealing effectiveness and without requiring frequent adjustment. Additionally, the seal accommodates a substantial degree of eccentricity and/or axial misalignment of the shaft and does not materially increase the starting torque required to be applied to the shaft.

Broadly stated, the device includes an end plate adapted to be fixed to the container or like apparatus through which the shaft passes, e.g. the bottom wall of a mixer or auger feed device. The plate includes an annular recessed well surrounding the shaft, the floor or lowermost surface of the well being formed by a disk or washer-like member formed of a polymeric material having a low coefficient of friction. The shaft directly above the well is provided with a radially extending flange, the outermost periphery of which preferably overlaps the periphery of the well. The flange, which is keyed to the shaft, preferably through an intermediate collar, carries therebelow a thrust washer having substantial weight, the washer being comprised of a section of a cylinder, the lowermost surface of which slidably engages the floor of the well.

The thrust washer is keyed to rotate with the flange but is free to shift in a vertical direction whereby the under surface of the washer is maintained by gravitational forces in engagement with the floor of the well. Preferably, the mating surfaces of the thrust washer and floor are disposed in co-planar alignment to provide an efficient seal against the passage between the relatively moving surfaces of pulverulent material, etc.

The seal will compensate automatically against wear due to the ability of the thrust washer to maintain its sliding engagement with the anti-friction washer under thr influence of gravity.

It is accordingly an object in the invention to provide an improved, self-compensating rotary seal for a vertical shaft, such as a drive shaft.

A further object of the invention is the provision of a seal of the type described which may compensate for eccentricities in the mounting of movement of the shaft during rotation.

A further object of the invention is the provision of a seal of the type described which is simple to manufacture, requires a minimum of maintenance, provides maximum protection against the passage of pulverulent matter, and does not materially increase starting torque.

Still a further object of the invention is the provision of a seal of the type described which is wear compensating, such compesation resulting from the provision of a weighted thrust washer which bears against an antifriction surface at a circular contact area surrounding the shaft component, the washer being yieldably pressed against the anti-friction surface under gravitational influences and being free to shift downwardly.

To attain these objects and such further objects as may appear or be hereinafter pointed out, reference is made to the accompanying drawings, forming part hereof, in which:

FIG. 1 is a bottom plan view of the seal construction in accordance with the invention;

FIG. 2 is a vertical section taken on the line 2—2 of FIG. 1;

Figure 3:
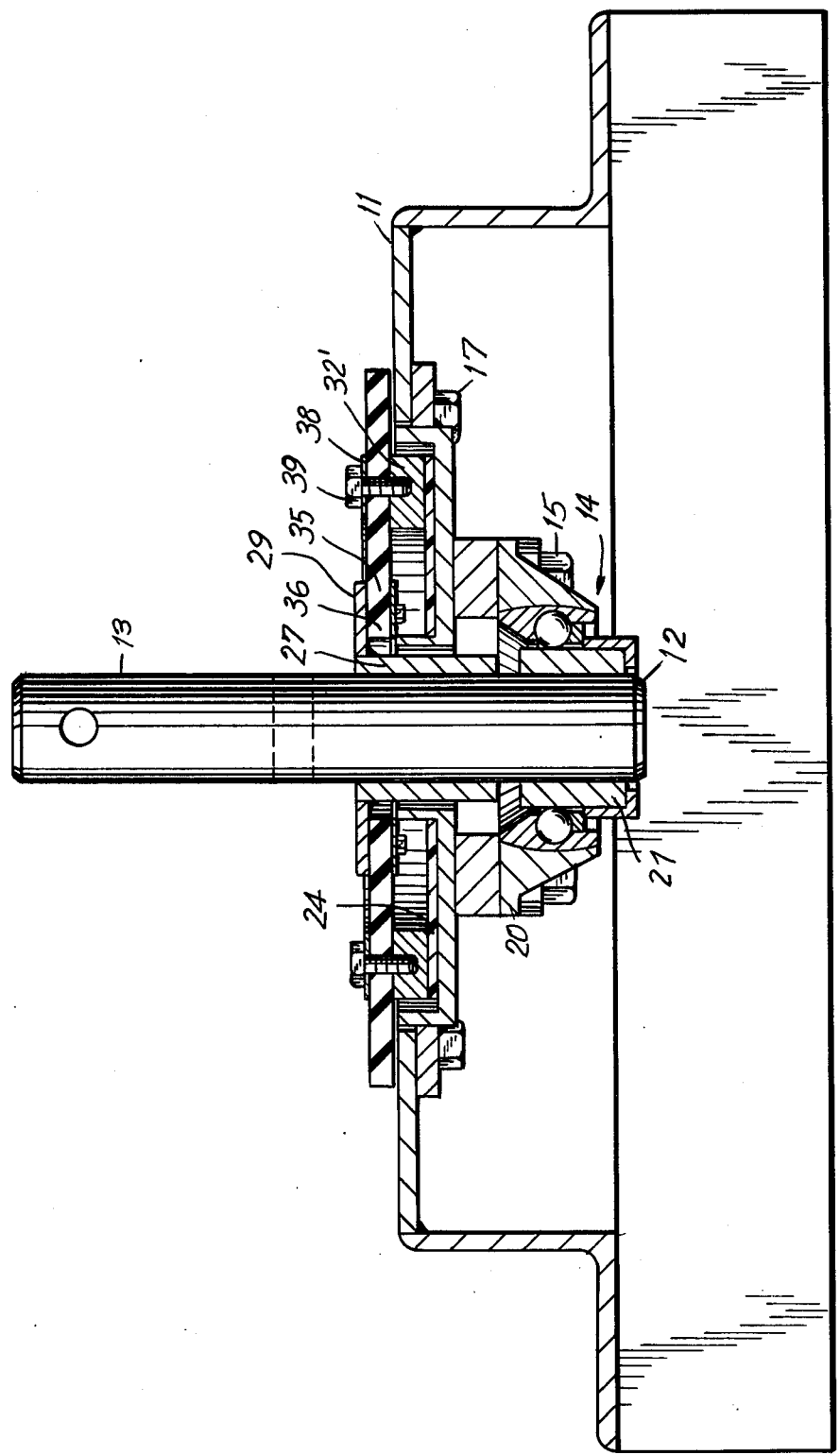
FIG. 3 is a sectional view similar to the view of FIG. 2 depicting a further embodiment of the invention.

In accordance with the invention as exemplified in FIG. 1, the under surface of a seal assembly 10 has been fixed, by way of illustration only, to a base 11, which base 11 may be the floor of a mixer, drum, bottom plate of a vertical auger feed or like installation wherein a revoluble shaft passes through a boundary and wherein it is desired to prevent the downward passage of pulverulent material through the boundary.

In the illustrated embodiment, the lower end 12 of the shaft 13 is disclosed as being mounted in a conventional ball bearing assembly 14 secured to the seal by machine screws 15. It should be understood that the ball bearing assembly 14 is illustrated by way of example only and need not form a component fo the assembly. For instance, the lower end 12 of the shaft 13 may be connected to a drive motor power take-off.

The seal assembly includes a mounting plate 16, fixed by machine screws or bolts 17 within an aperture 18 formed through the base 11. Gasketting material (not shown) may be interposed between the opposed surfaces of the plate 18 and the base 11. The mounting plate 16 may include an upwardly directed annular skirt 19 which fits intimately within the opening 18 in the base 11.

As noted, the outer race 20 of the ball bearing assembly is made fast by machine screws 15 to the plate 16, the inner race 21 of the bearing receiving and being secured to the lower end of the shaft 12.

Manifestly, continued efficiency of the bearing assembly 14 is dependent upon the same being maintained in a clean running condition. Where pulverulent material, e.g. sand, sugar, etc., is processed in the area above the base 11, there is a substantial tendency for increments thereof to pass downwardly along the shaft and into the bearing, resulting in interference with the free running thereof. It is the function of the seal member to block egress of such material.

For this purpose, the mounting plate 16 includes a ring-shaped recess or well area defined between outer, upwardly extending cylindrical wall portion 22 and inner, upwardly extending cylindrical wall portion 23. It will be observed that the wall defined between the noted wall portions completely surrounds the shaft 13.

On the floor of the well W, there is provided an anti-friction washer 24 having a central opening 25 surrounding the inner cylindrical wall 23 defining the well. The anti-friction washer is preferably formed of a polymeric material having a low frictional coefficient and high wear properties. By way of example and without limitation, the washer 24 may be fabricated of Teflon (trademark of DuPont Corporation), nylon, ultra high density polyethylene or Delrin, the latter being the trademark for nylon-acetyl resin sold by DuPont Corporation.

The washer 24 is fixed in position within the well either by an adhesive connection between the washer and the upwardly directed surface 26 of the well of by some alternative means.

The thus far described elements constitute the fixed or non-rotating components of the seal assembly.

The rotary components of the seal assembly include a collar member 27 sleeved over the shaft 13, the collar extending downwardly through the central opening 28 in the mounting plate 16.

The collar includes a radially extending flange element 29 spaced from and parallel to the anti-friction washer 24.

In the embodiment of FIG. 2, a collar flamge extension 30 is fixed to the flange element 29 of the collar, the flange extension 30 extending radially a distance sufficient to overlap the outer cylindrical wall 22 definning the well W.

The flange extension 30 includes a plurality of angularly spaced-apart, vertically directed drive pins 31, 31 which extend toward but terminate in spaced relation to the washer 24. The rotary component of the member is completed by the thrust washer member 32, the latter being annular and formed of a relatively heavy metal which is resistant to wear, e.g. steel.

The washer 32 includes a plurality of angularly spaced-apart blind apertures 33, the spacing of the apertures 33 corresponding with the spacing of the drive pins 31, the diameter of the apertures being sufficiently greater than the pins 31 to permit the thrust washer 32 to float within the well, being biased by gravitational influences against the anti-friction washer 24.

Preferably the under surface 34 of the thrust washer 32 is lapped to define a planar, abrasionless surface which will engage an annular area with the anti-friction washer 24.

From the foregoing description it will be evident that when the shaft 13 is rotated, the same will carry with it the collar 27, flange portion 29 and flange extension 30 carrying drive pins 31. The drive pins 31 will rotate thrust washer 32, which is free to move in a downward direction by virtue of the telescoping or sliding fit of the pins 31 in the apertures 33 in the thrust washer.

The rotating, mating surfaces of the thrust washer and anti-friction washer provide an efficient seal against the passage of pulverulent material through the interface defined therebetween.

It will be noted that the seal is not subject to binding, despite moderate eccentricity of the shaft, since the thrust washer 32 is free to move radially relatively to the shaft axis, such compensating movements not interfering with the effectiveness of the seal.

It will be further noted that upon wearing of either the anti-friction surface or of the thrust washer, contact between the noted parts will not be lost since the thrust washer is always maintained, under gravitational influences, against the surface of the anti-friction washer.

Turning now to the embodiment of FIG. 3, wherein like parts are given like reference numerals, it will be seen that the stationary portions of the seal assembly, notably the well, anti-friction washer, etc. are identical to those of FIG. 2.

The principal difference between the assembly of FIG. 3 and that of FIG. 2 lies in the means by which thrust washer 32' is permitted to be driven with the shaft but nonetheless be gravitationally pressed against the anti-friction washer 24.

The driving and heightwise compensating connections of the embodiment of FIG. 3 are provided by the utilization of an elastomeric annular flange member 35, the inner edge 36 of which is secured to the flange element 29 of the collar 27 by a clamping ring 36 held by machine screws 37 to the flange element 29. A thin backing ring 38, located in radially spaced relation to the flange element 29, is disposed above the thrust washer 32', a radially spaced series of machine screws 39 extending through the backing ring 38 and into the body of the thrust washer 32', thus to mount the thrust washer to the elastomeric flange member 35.

The elastomeric drive flange 35 is formed of a limp material, whereby the relatively small weight of the thrust washer 32' is sufficient to cause the flange 35 to deflect downwardly and engage against a ring-like area of the upper surface of the anti-friction washer 24 in the same manner as described in connection with the embodiment of FIG. 2. Although an elastomer is preferred for the flange 35, it will be appreciated that functionally equivalent materials, such as cloth and impregnated cloth, may be employed.

Whereas the downward movement of the thrust washer 32 in the prior embodiment is accommodated by a telescoping movement of drive pins and apertures in the washer, the movement in the instant embodiment is accommodated by a downward flexure of the member 35, as noted.

The operation of the device of the embodiment of FIG. 3 is identical to that of FIG. 2 and, therefore, furhter discussion thereof is not considered necessary.

It will be readily recognized that variations may be made in the construction of the seal device without departing from the spirit of the invention.

By way of example, the weight of the thrust washer may be modified, utilizing a heavy thrust washer where greater sealing is desired and where the slight additional torque needed to turn the same does not pose a problem.

Additionally, where, as in the illustrated embodiments, the device is used in combination with a bearing member disposed below the mounting plate, it is feasible to employ smaller clearance between the outermost radial edge of the thrust washer and the outer skirt member 22, since the employment of a bearing virtually precludes the possibility of any significant eccentricity. In such construction it is feasible to fabricate the outer annular wall member 22 of an anti-friction material.

In accordance with a further variation, the flange extension 30 may project in a radial direction a substantial distance beyond the well, and a further gravity actuated seal member may be interposed between the flange extension and overlapped portions of the base or casing, providing a preliminary barrier against the passage of pulverulent material to the primary seal area.

Accordingly, the invention is to be broadly construed within the scope of the appended claims.

Having thus described the invention and illustrated its use, what is claimed as new and is desired to be secured by Letters Patent is:

1. A low pressure, self-compensating rotary seal assembly for a vertical drive shaft comprising a mounting plate member adapted to be maintained in generally horizontal disposition, said plate having a vertically directed central aperture for the passage therethrough of of said drive shaft, a depending annular well member formed in said plate surrounding and concentric with said aperture, said well member including an inner upstanding cylindrical wall portion adjacent said shaft and an outer cylindrical upstanding wall portion radially outwardly spaced from said inner wall portion, a collar member adapted to be keyed to said shaft extending downwardly through said aperture, an anti-friction washer member disposed in said well between said cylindrical wall portions and defining a floor of said well, the uppermost face of said washer being disposed in a plane normal to the axis of said shaft, a cylindrical thrust washer disposed within said well, said washer being formed of high density metal and including a lower planar face portion biased against said uppermost face of said antifriction washer under gravitational influences, an annular flange portion extending from said collar and overlying said well, and drive means coupling said thrust washer to said flange portion for conjoint rotation, said drive means permitting a range of vertical relative movement between said collar and thrust washer whereby said thrust and antifriction washers are maintained in emgagement under gravitational influences notwithstanding wear.

2. An assembly in accordance with claim 1 wherein said anti-friction washer is formed of a polymeric material.

3. An assembly in accordance with claim 1 wherein said drive means connecting said collar and thrust washer comprises a vertically directed pin and socket connection.

4. An assembly in accordance with claim 3 wherein said thrust washer includes a plurality of vertically directed socket portions, and said flange includes a plurality of vertically directed depending drive pin members loosely received in said socket portions.

5. An assembly in accordance with claim 1 wherein said flange portion is comprised of a limp, flexible material, and said drive means comprises a connection extending between said flange portion and said thrust washer, said connection being located in radially spaced relation to said collar, said vertical movement of said thrust washer being accommodated by deflection of said flange portion.

6. An assembly in accordance with claim 5 wherein said flange portion comprises an elastomer.

7. Apparatus in accordance with claim 1 wherein at least one of said cylindrical wall portions is comprised of polymeric material having a low coefficient of friction.

8. A low pressure, self-compensating rotary seal assembly for a vertical drive shaft comprising a mounting plate member adapted to be maintained in generally horizontal disposition, said plate having a vertically directed central aperture for the passage therethrough of said drive shaft, an anti-friction washer member fixedly mounted to an upwardly facing surface of said plate surrounding said shaft, a cylindrical thrust washer surrounding said shaft, an under surface of said washer being biased by gravitational influence into contact with said antifriction washer at an annular contact area surrounding said shaft, and drive means coupling said thrust washer to said shaft for rotation therewith while permitting said thrust washer a range of vertical movement relative to said shaft.

* * * * *